Aug. 4, 1931.    C. L. MASTERS    1,817,444
PROCESS OF RECOVERING PHENOL FROM LIQUORS CONTAINING THE SAME
Filed June 4, 1927
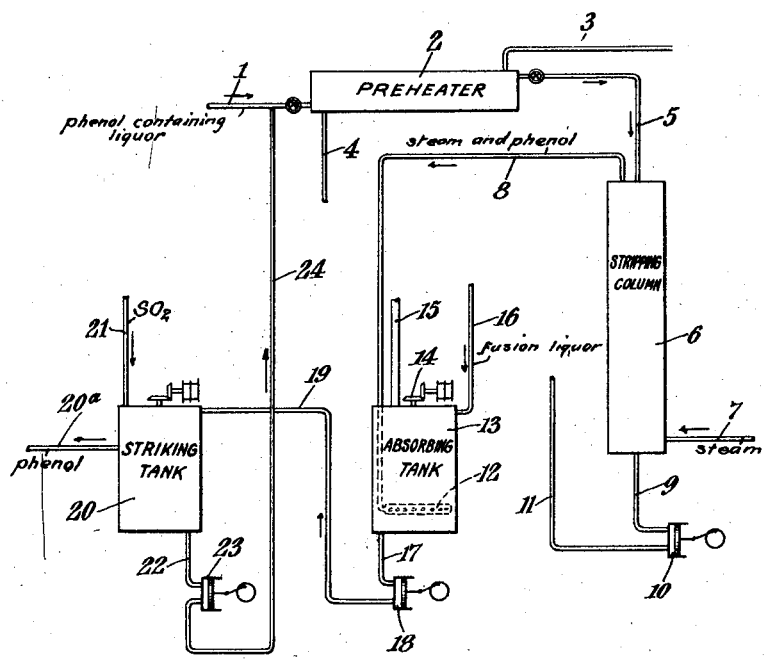

Patented Aug. 4, 1931

1,817,444

UNITED STATES PATENT OFFICE

CARL L. MASTERS, OF NITRO, WEST VIRGINIA, ASSIGNOR, BY MESNE ASSIGNMENTS, TO ELKO CHEMICAL COMPANY, A CORPORATION OF WEST VIRGINIA

PROCESS OF RECOVERING PHENOL FROM LIQUORS CONTAINING THE SAME

Application filed June 4, 1927. Serial No. 196,454.

My invention relates particularly to a process for the recovery of phenol from liquors containing the same, but it has relation especially to the recovery of phenolic compounds from fusion liquors after treatment with acid, and from which the major portion of the phenolic compound has been removed by separation, decantation, etc.

The object of my invention is to provide a process by means of which the phenolic compounds, such, for example, as phenol, beta naphthol, etc., may be removed from the sludge produced by the treatment of fusion liquor with an acid and after which the main portion of the phenolic compound has been removed.

It is well known that phenolic compounds are produced by the use of organic alkali metal sulphonates with alkali metal hydroxides according to the following reaction:

$$R.SO_3Me + 2MeOH \rightarrow R.OMe + Me_2SO_3 + H_2O$$

Certain methods are known by which the phenolic compounds may be separated from the fusion product, for example, by the addition of an acid to the fusion product which has been previously dissolved, for example, in accordance with the following reaction:

$$ROMe + (Me_2SO_3) + H_2SO_4 \rightarrow R.OH + (Me_2SO_3) + Me_2SO_4$$

In accordance with my process any acid may be used for the above purpose and instead of sulphuric acid, as indicated in the above reaction, I may use hydrochloric acid or sulphur dioxide, if desired. In carrying out my process I take the crude liquor to which the acid material has been added and from which the greater part of the free phenolic compound has been removed by separation, decantation, etc., and pass this solution through a heat exchanger and a stripping column countercurrent to a current of steam which may be obtained from any suitable source. The steam which passes out of the stripping column, and which contains the phenolic compound, is then passed through the solution obtained by dissolving the fusion product referred to, in water or weak sodium sulphite solution. This solution contains free alkali hydroxide which unites with the free phenolic compound carried over by the steam in accordance with the following reaction:

$$ROH + MeOH \rightarrow ROMe + H_2O$$

The product thus obtained is non-volatile and is retained by the fusion liquor, the surplus steam either escaping or being used elsewhere, as desired.

While my invention is capable of being carried out in many different ways, I shall describe only certain ways of carrying out the same hereinafter, and while it is capable of being carried out in connection with many different types of apparatus, I have shown only one type of apparatus for use in connection with the accompanying drawings, in which—

The figure is a diagrammatic representation of an apparatus made in accordance with my invention.

For example, in carrying out my invention, in the case where fusion liquors are used resulting from the production of phenol, I start with the fusion liquor obtained from the fusion of an organic alkali metal sulphonate with sodium hydroxide and the product of which fusion, after the major portion of the phenol produced by the action of sulfur dioxide has been removed by decantation or otherwise. The liquid thus obtained is supplied by a pipe 1 to a preheater 2 which is preheated by means of a current of steam supplied by an inlet pipe 3, and which is exhausted through an outlet pipe 4. This preheated steam is supplied from a source which will be hereinafter described. From the preheater 2 the liquid is conveyed by a pipe 5 to a stripping column 6 filled with Raschig rings or other filling material, or which may be a distilling column constructed in any other desired manner. In the column 6 the said liquid passes countercurrent to an upwardly flowing current of steam supplied through a pipe 7 entering the bottom of the column 6 and exhausted from the top of the column by a pipe 8 leading to any other suitable point for further use, if desired. In the course of the treatment of the liquid in the column 6 the phenol is entirely removed and the resultant liquid passes out of the bottom of the column 6 by means of a pipe 9 and thence to a pump 10 from which it is delivered by a pipe 11 to any desired receptacle for storage or use, as desired. The concentrated sulphite liquor thus obtained may be conveyed away for utilization, or recovery of the sodium sulphite therefrom in any desired manner. The steam and phenol discharged from the pipe 8 are conveyed by said pipe to a perforated distributor 12 in an absorbing tank 13, containing fusion liquor obtained from the fusion of an organic alkali metal sulphonate with sodium hydroxide to which water has been added, heated to the boiling point thereof by means of steam and phenol passed thereinto through pipe 8, provided with an agitator 14 driven by any suitable source of power. As a result, the phenol is absorbed, as it combines with the alkali hydroxide in the tank 13 producing an alkali phenate. A vent 15 at the top of the tank 13 carries off any steam which is not absorbed in the liquor. The fusion liquor for the tank 13 is supplied thereto by a pipe 16 and after being subjected to the action of the current of phenol and steam, is carried off by a pipe 17 containing a pump 18 and delivered by a pipe 19 to a striking tank 20 in which the liquor is subjected to the action of any desired acid material, as, for example, sulphur dioxide, in accordance with the following reaction:

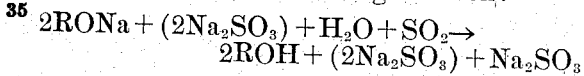

$$2RONa + (2Na_2SO_3) + H_2O + SO_2 \rightarrow$$
$$2ROH + (2Na_2SO_3) + Na_2SO_3$$

After this reaction has taken place the major portion of the phenol, which forms a separate supernatant layer, is drawn off by an overflow pipe 20a. The acid material is brought into the tank 20 with the aid of a pipe 21 connected to the top of the tank 20. The resultant product, comprising dissolved phenol and sodium sulphite, is then delivered by a pipe 22 to a pump 23 and thence by a pipe 24 to the pipe 1.

It will be understood that my process may be carried out, also, with other phenolic compounds instead of the phenol just described, as, for example, beta naphthol.

While I have described my invention above in detail I wish it to be understood that many changes may be made therein without departing from the spirit of the same.

I claim:

1. In the process of recovering a phenol from an acid solution of the same, the steps which comprise steam distilling said solution, passing said distillate without condensation into a substantially boiling aqueous solution of an alkaline fusion product of an organic alkali metal sulphonate and an alkali metal hydroxide.

2. In the process of recovering phenol from an acid solution of the same, the steps which comprise steam distilling said solution, passing the distillate without condensation into a substantially boiling aqueous solution of an alkaline fusion product of an organic alkali metal sulphonate and an alkali metal hydroxide.

3. In the process of recovering a phenol from an acid solution of the same, the steps which comprise passing the same carried in a current of steam, into a substantially boiling aqueous solution of a fusion product of an organic alkali metal sulphonate and an alkali metal hydroxide.

4. In the process of recovering phenol from an acid solution of the same, the steps which comprise passing the same carried in a current of steam, into a substantially boiling aqueous solution of a fusion product of an organic alkali metal sulphonate and an alkali metal hydroxide.

5. The process of recovering a phenol from an acid solution of the same, which comprises steam distilling said solution, passing said distillate without condensation into a substantially boiling aqueous solution of an alkaline fusion product of an organic alkali metal sulfonate and striking out the phenol from the phenolate so formed by treatment with an acid.

6. The process of recovering phenol from an acid solution of the same which comprises steam distilling said solution, passing the distillate without condensation into a substantially boiling aqueous solution of an alkaline fusion product of sodium benzene sulfonate and striking out the phenol from the sodium phenolate so formed by treatment with an acid.

7. In the process of recovering a phenol from an acid solution of the same, the steps which comprise steam distilling said solution, passing the distillate without condensation into an aqueous solution of a fusion product of an organic alkali metal sulphonate and an alkali metal hydroxide without substantial condensation of the steam passed thereinto.

In testimony that I claim the foregoing, I have hereunto set my hand this 21st day of February, 1927.

CARL L. MASTERS.